April 27, 1948.  C. M. HATHAWAY  2,440,605

ACCELEROMETER

Filed May 10, 1945

INVENTOR.
Claude M. Hathaway
BY
Moore, Olson & Trexler
attys.

Patented Apr. 27, 1948

2,440,605

UNITED STATES PATENT OFFICE 2,440,605

ACCELEROMETER

Claude M. Hathaway, Denver, Colo., assignor to Hathaway Instrument Company, a corporation of Colorado Application May 10, 1945, Serial No. 592,945

10 Claims. (Cl. 177—351)

The present invention relates to accelerometers and more particularly to an accelerometer unit particularly suited for electrical recording of high velocities.

In the operation of aircraft it is designed to provide a record of the acceleration together with a record of other factors in order to analyze the operating characteristics and performance of the craft. Each device provided for making such records must be capable of withstanding severe strains and yet must provide reliable and accurate indication.

For recording acceleration an accelerometer is used which provides an electrical quantity for the actuation of a recording apparatus commonly referred to as a flight analyzer. Accordingly it is highly desirable to provide an accelerometer which will directly give electrical quantity without the necessity of translation from a mechanical movement to an electrical quantity. This is accomplished in accordance with the present invention by providing an electromagnetic device having a plurality of magnetic coils so arranged that the acceleration operating upon a weight will increase or decrease the impedance of the coils which may be connected in a bridge circuit to provide the desired electrical indication.

Such an instrument must be rugged and accurate and must be also provided with the necessary damping action so as to avoid spurious indications. To provide damping it is common to employ a fluid such as oil, but provision must be made for the expansion and contraction of the oil with temperature variations which are encountered in the flight of aircraft.

Accordingly it is an object of the present invention to provide an improved accelerometer unit with electrical recording of acceleration and deceleration of bodies moving at relatively high velocities.

It is a further object of the present invention to provide an improved accelerometer unit which is compact and which provides a highly accurate indication.

Figure 1:
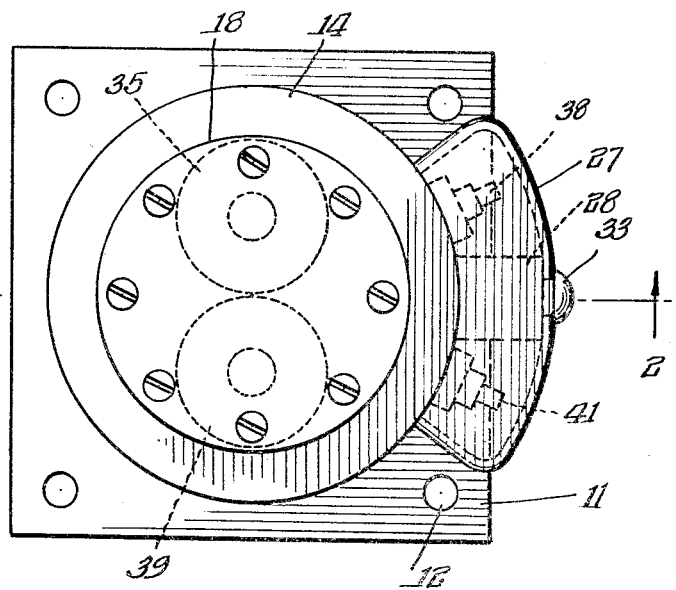
Figure 2:
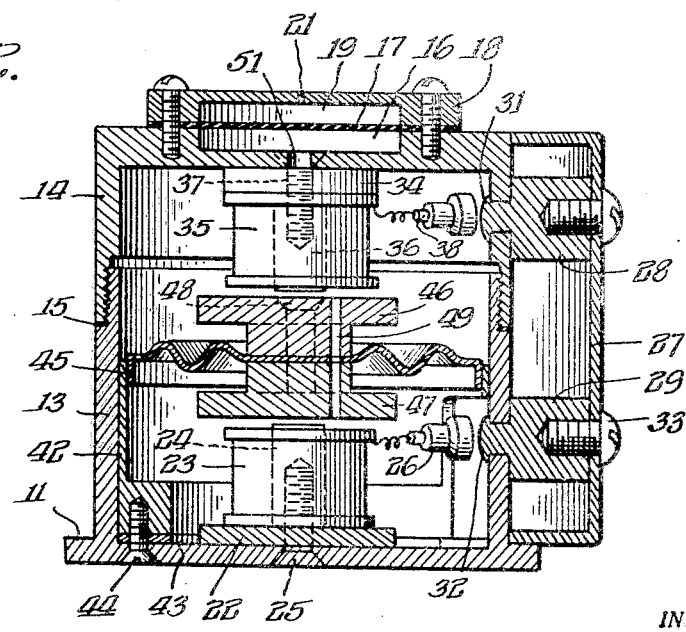

Other and further objects of the present invention subsequently will become apparent by reference to the following description taken in connection with the accompanying drawing wherein Figure 1 is a top view of the device embodying the present invention; and Figure 2 is a cross sectional view of the device shown in Figure 1 as seen in the direction of the arrows along the line 2—2.

Referring to the drawing it will be seen that there is provided a mounting plate 11 having a plurality of holes 12 for fastening the device in fixed relation to the vehicle or body of which it is desired to obtain a record of acceleration. The fastening frame or base 11 has a cylindrical casing formed in two parts as is apparent from Figure 2 wherein the lower portion 13 may be formed integrally with the base or mounting portion 11. The upper portion 14 is secured to the lower portion 13 by cooperating internal and external threaded portions on the two members which are screwed together and sealed by a suitable gasket 15 to provide an oil tight casing. The top member 14 is provided with a recess 16 which is adapted to be closed by a diaphragm 17 which preferably is made of an oil resistant material such as one of the synthetic rubber materials. This diaphragm 17 is retained in position by a cap 18 having a recess 19 of substantially the same size and configuration as the recess 16 in the top member 14. The cap 18 is provided with a central aperture 21 to permit the passage of air therethrough. The recess 16 closed by the diaphragm 17 therefore constitutes an expansion chamber for the oil which is contained within the housing comprising the top and bottom sections 13 and 14.

Mounted within the interior of the casing are a plurality of electromagnetic coils. One pair of coils is secured to the bottom portion of the casing 13 and another pair of coils is secured to the top portion of the casing 14. The relation of these pairs of coils is indicated by the dotted line representation of Figure 1. One of the coils of each pair of coils is visible in Figure 2. The bottom portion of the chamber 13 contains a support plate 22 which carries the bottom pair of electromagnetic coils. One of these coils 23 is shown with its magnetic core 24 secured in position by a suitable screw 25 passing thereinto from the exterior of the casing 13. The two bottom coils are electrically connected in series and one terminal of each of the coils is connected to a suitable binding post. One of the binding posts 26 of the bottom section is visible in Figure 2. The binding post is mounted in a suitable insulating member and extends to the exterior of the casing 13 into a binding post housing 27. The binding post housing 27 is retained in position by a plurality of spacing posts 28 and 29 each secured to one half of the casing in any suitable manner such as the insertion of a reduced end portion which is riveted over as at 31 and 32. The binding post housing 27 is retained in position by a plurality of screws 33 which engage suitable recesses in the support posts 28 and 29.

The binding post housing 27 protects the binding posts and also the terminals at the end of a suitable cable which connects the accelerometer to an electrical circuit including the bridge circuit, the output of which is connected to an electrical recorder or flight analyzer. The upper portion 14 of the housing is also provided with a support block 34 against which is positioned an electromagnetic coil 35 having a magnetic core 36 secured in position by a screw 37. The coil 35 is connected to a binding post 38 mounted in the upper housing portion 14 in a suitable insulator. The coil 35 is connected in series with a similar coil designated by the dotted line representation 39 of Figure 1 which is connected to a binding post 41 within the cover 27.

The lower housing portion 13 contains a hollow annular support 42 which may be secured in the desired position by a spacing washer or ring 43 and held in such position by a plurality of screws 44. The inner support member 42 engages the outer periphery of a diaphragm 45. The outer periphery of the diaphragm 45 may be secured to the support 42 in any suitable manner such as by soldering.

The diaphragm 45 which preferably is corrugated, supports at its center two similar circular weight members.

The entire housing is filled with oil to provide the desired damping action. In order to provide for the desired degree of displacement or freedom of displacement of the weight members relative to the pairs of magnets, the upper and lower halves of the housing are interconnected by a fluid passage. While this fluid passage may be a part of the external housing or even be a conduit extending to the exterior of the housing, it has been found convenient to provide a fluid passage 49 directly through the two weight members 46 and 47 and the diaphragm 45 after these parts have been assembled together. As has been mentioned the conduit, however, may be arranged adjacent the exterior of the housing where the conduit may be provided with suitable means for controlling the amount of opening between the two halves of the interior of the casing thereby regulating the degree of damping to be provided.

When the weighted members are displaced in either direction, the volume of one half of the housing decreases and the other half increases so that oil flows through the conduit 39. In order to provide for the proper expansion and contraction of the oil due to temperature variations, it was previously mentioned that the upper housing portion 14 was provided with a recess 16 closed by a synthetic rubber diaphragm 17. To permit oil to flow into the expansion chamber 16, there is provided a fluid passage 51 between the recess 16 and the inside of the upper housing portion 14.

From the foregoing it will be seen that there has been provided an accelerometer unit contained in a sealed oil filled case which is rugged and yet relatively simple to manufacture. The provision of electromagnetic means responsive to the displacement of the accelerometer weight provides an arrangement obviating the use of any electrical contacts, variable resistors, or the like or any other translating means often times used to translate mechanical movement into electrical quantities. The two sets of electromagnetic coils have impedances which vary inversely in accordance with the displacement of the weight members 46 and 47 from their normal central position. Due to the use of two sets of electromagnetic coils so arranged, it is possible to record directly both acceleration and deceleration.

While for the purpose of illustrating and describing the present invention, certain preferred embodiments have been shown and described, it will be understood that such variations in the arrangement and in the instrumentalities employed are contemplated as may be commensurate with the spirit and scope of the invention set forth in the following claims.

This invention is hereby claimed as follows:

1. An accelerometer comprising a housing containing a pair of electromagnetic impedances, a mass subject to the effects of acceleration and deceleration, said mass being mounted on a flexible diaphragm between said impedances and so related to said electromagnetic impedances as to cause opposite changes in impedances thereof in accordance with the displacement of said mass from its normal position, said diaphragm being mounted to divide said housing into two chambers, and fluid means for damping the movement of said mass including a fluid passage extending through said diaphragm.

2. An accelerometer comprising a housing having an upper portion and a lower portion, an electromagnetic impedance mounted in each portion, a magnetic mass resiliently mounted between said impedances, a fluid passage interconnecting the upper and lower portions of the interior of said housing, and a fluid expansion chamber connected with the interior of said housing, said fluid expansion chamber being provided with a flexible fluid resistant diaphragm.

3. The combination comprising a housing divided into two chambers by a flexible diaphragm, a mass supported by said diaphragm, a plurality of magnetic impedances arranged on opposite sides of said mass, said electromagnetic impedances in response to movement of said mass being arranged to be subjected to inverse impedance changes, a fluid passage extending from one side of said diaphragm to the other and a fluid expansion chamber arranged exteriorly of said housing having a passage connecting said chamber with the interior of said housing, said chamber being provided with a flexible diaphragm communicating with atmospheric pressure.

4. The combination comprising a cylindrical housing formed in two portions arranged to be connected together by cooperating threaded portions, means mounted in one of said portions for supporting a diaphragm to divide the interior of said housing into two chambers, a fluid passage interconnecting said two chambers, a fluid expansion chamber having a passage connected to one of said two chambers, a mass mounted on said diaphragm, a pair of electromagnetic coils mounted in each portion of said housing equidistant from the normal position of said mass, said electromagnetic coils being so arranged as to be subject to opposite changes of impedance in accordance with the movements of said mass, and means for making electrical connections to each pair of said electromagnetic coils.

5. The combination comprising a cylindrical housing formed in two portions interconnected by cooperative threaded portions, a fluid expansion chamber having a flexible diaphragm exposed to the atmosphere, a passage interconnecting said fluid expansion chamber with the interior of said housing, a support member mounted in said housing, said support member being connected to a diaphragm for dividing the interior of said housing into two chambers, a fluid passage interconnecting said chambers, a mass supported at the center of said diaphragm, and a pair of electromagnets mounted in each chamber with the pole pieces thereof arranged to be magnetically interconnected by the mass mounted on said diaphragm, a plurality of oil tight bushings mounted in each portion of said housing, binding posts mounted in each of said bushings, electrical connections between said binding posts and said electromagnetic coils and a binding post housing supported from the exterior of said housing to protect the exterior terminals of said binding posts.

6. An accelerometer comprising a fluid-tight housing having an upper portion and a lower portion, an electromagnetic impedance mounted in each portion, a magnetic mass resiliently mounted by means of a diaphragm between said impedances, and a fluid expansion chamber connected with the interior of said housing, said fluid expansion chamber being provided with a diaphragm of synthetic elastic material.

7. The combination comprising a housing, a flexible diaphragm arranged to divide said housing into two chambers, a magnetic mass supported by said diaphragm, a plurality of electromagnetic coils arranged on opposite sides of said mass, said electromagnetic coils in response to movement of said mass being arranged to be subjected to inverse impedance changes, and a fluid expansion chamber arranged exteriorly of said housing having a passage connecting said chamber with the interior of said housing, said chamber being provided with a fluid expansion diaphragm of synthetic elastic material having a surface in communication with atmospheric pressure.

8. An electromagnetic instrument comprising a plurality of electromagnetic coils arranged in spaced relation and mounted in a casing, a diaphragm arranged between said coils to divide said casing into two chambers, a paramagnetic armature resiliently mounted on said diaphragm between said coils, and fluid means within said chambers for damping the movement of said armature and said diaphragm including a passage interconnecting said chambers.

9. An electromagnetic instrument comprising a plurality of electromagnetic coils arranged in spaced relation and mounted in a casing, a diaphragm positioned between said coils so as to divide said casing into two chambers, a paramagnetic armature resiliently mounted on opposite sides of said diaphragm between said coils, fluid means within said chambers for damping the movement of said armature, and a fluid passage interconnecting said chambers.

10. An electromagnetic device comprising a plurality of pairs of electromagnetic coils mounted in spaced relation in a casing, a diaphragm arranged in spaced relation between said pairs of coils to divide said casing into two chambers, a paramagnetic armature mounted on each side of said diaphragm for causing opposite changes in the impedance of said pairs of coils upon displacement of said armatures from a normal position, fluid means for damping the movement of said armatures, and a fluid passage interconnecting said chambers.

CLAUDE M. HATHAWAY.

REFERENCES CITED

The following references are of record in the file of this patent:

UNITED STATES PATENTS

| Number | Name | Date |
| --- | --- | --- |
| 2,064,489 | Neuman | Dec. 15, 1936 |
| 2,074,417 | Olsen | Mar. 23, 1937 |
| 2,147,060 | Reynolds | Feb. 4, 1939 |
| 2,210,970 | Bonell | Aug. 13, 1940 |
| 2,303,413 | Washburn | Dec. 1, 1942 |
| 2,311,079 | Parr, Jr. | Feb. 16, 1943 |

Certificate of Correction

Patent No. 2,440,605.

April 27, 1948.

CLAUDE M. HATHAWAY

It is hereby certified that error appears in the printed specification of the above numbered patent requiring correction as follows: Column 1, line 5, for the word "designed" read *desired*; and that the said Letters Patent should be read with this correction therein that the same may conform to the record of the case in the Patent Office.

Signed and sealed this 20th day of July, A. D. 1948.

[SEAL]

THOMAS F. MURPHY,
*Assistant Commissioner of Patents.*